(12) United States Patent
Kuehnle

(10) Patent No.: US 12,434,714 B2
(45) Date of Patent: Oct. 7, 2025

(54) VEHICLE-BASED INTERVENTION BASED ON MODELING DRIVER PERFORMANCE

(71) Applicant: Bendix Commercial Vehicle Systems LLC, Elyria, OH (US)

(72) Inventor: Andreas U. Kuehnle, Villa Park, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 286 days.

(21) Appl. No.: 17/319,322

(22) Filed: May 13, 2021

(65) Prior Publication Data

US 2022/0379900 A1    Dec. 1, 2022

(51) Int. Cl.
| | |
|---|---|
| *G07B 5/00* | (2006.01) |
| *B60W 10/04* | (2006.01) |
| *B60W 10/18* | (2012.01) |
| *B60W 10/20* | (2006.01) |
| *B60W 30/09* | (2012.01) |

(Continued)

(52) U.S. Cl.
CPC ............ *B60W 40/09* (2013.01); *B60W 10/04* (2013.01); *B60W 10/18* (2013.01); *B60W 10/20* (2013.01); *B60W 30/09* (2013.01); *B60W 30/12* (2013.01); *B60W 50/14* (2013.01); *B60W 2420/403* (2013.01); *B60W 2540/10* (2013.01); *B60W 2540/12* (2013.01); *B60W 2540/18* (2013.01);

(Continued)

(58) Field of Classification Search
CPC ...... B60W 40/09; B60W 10/04; B60W 10/18; B60W 10/20; B60W 30/09; B60W 30/12; B60W 50/14; B60W 2554/804; B60W 2540/223; B60W 2554/802; B60W 2420/42; B60W 2540/10; B60W 2540/12; B60W 2540/18

See application file for complete search history.

(56) References Cited

U.S. PATENT DOCUMENTS

| 10,127,810 B2 | 11/2018 | Durie, Jr. et al. | |
|---|---|---|---|
| 2008/0262676 A1* | 10/2008 | Kawakami | B62D 15/029 701/41 |

(Continued)

OTHER PUBLICATIONS

Fang et al., "PD Controller for Car-Following Models Based on Real Data", Proceedings of the 1st Human-Centered Transportation Simulation Conference, Nov. 4-7, 2001, pp. 1-6, Iowa City, IA, (six (6) pages).

(Continued)

*Primary Examiner* — Scott A Browne
*Assistant Examiner* — Rami Nabih Bedewi
(74) *Attorney, Agent, or Firm* — Crowell & Moring LLP

(57) ABSTRACT

A vehicle-based safety intervention system receives sensor data collected or generated by an onboard computing system of a vehicle. The sensor data is divided into a plurality of blocks, each of the blocks having a duration. A driver behavioral model is applied to one or more of the plurality of blocks to generate one or more driver behavioral parameters. A trend of the one or more driver behavioral parameters is extracted from the plurality of blocks. Based on the extracted trend, it is determined that a driver's performance when operating the vehicle is unsatisfactory or will be unsatisfactory in the future. A vehicle-based intervention is generated based on the determination that the driver's performance is unsatisfactory or will be unsatisfactory in the future.

14 Claims, 9 Drawing Sheets

(51) Int. Cl.
*B60W 30/12* (2020.01)
*B60W 40/09* (2012.01)
*B60W 50/14* (2020.01)
*G07C 5/02* (2006.01)
*G09B 19/16* (2006.01)

(52) U.S. Cl.
CPC . *B60W 2540/223* (2020.02); *B60W 2554/802* (2020.02); *B60W 2554/804* (2020.02)

(56) References Cited

U.S. PATENT DOCUMENTS

| | | | | |
|---|---|---|---|---|
| 2010/0109881 | A1* | 5/2010 | Eskandarian | B60K 28/066 |
| | | | | 340/576 |
| 2015/0213555 | A1* | 7/2015 | Barfield, Jr. | H04W 4/48 |
| | | | | 705/4 |
| 2017/0028991 | A1* | 2/2017 | Buzzetti | B60W 50/14 |
| 2018/0032825 | A1* | 2/2018 | Fung | G06V 40/171 |
| 2019/0092337 | A1 | 3/2019 | Chua et al. | |
| 2020/0008732 | A1* | 1/2020 | Sawai | A61B 5/18 |
| 2020/0054264 | A1* | 2/2020 | Kojima | G08B 21/06 |
| 2020/0086882 | A1* | 3/2020 | Kodali | B60W 50/14 |
| 2021/0107494 | A1 | 4/2021 | Silver | |

OTHER PUBLICATIONS

International Search Report (PCT/ISA/210) issued in PCT Application No. PCT/US22/28508 dated Sep. 19, 2022 (three (3) pages).
Written Opinion (PCT/ISA/237) issued in PCT Application No. PCT/US22/28508 dated Sep. 19, 2022 (four (4) pages).
International Preliminary Report on Patentability (PCT/IB/326 & PCT/IB/373) issued in PCT Application No. PCT/US2022/028508 dated Nov. 23, 2023, including Written Opinion (PCT/ISA/237) (6 pages).

* cited by examiner

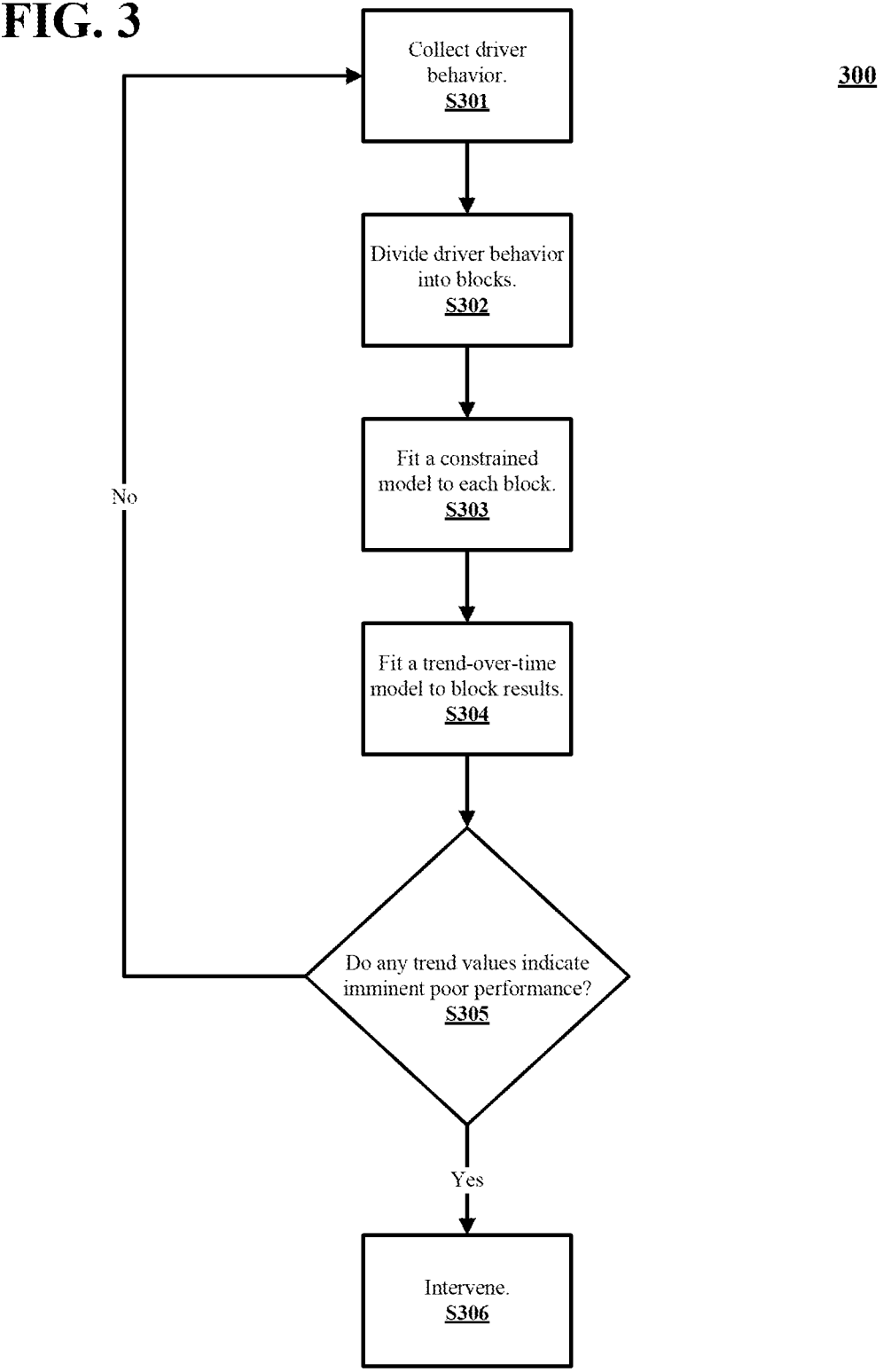

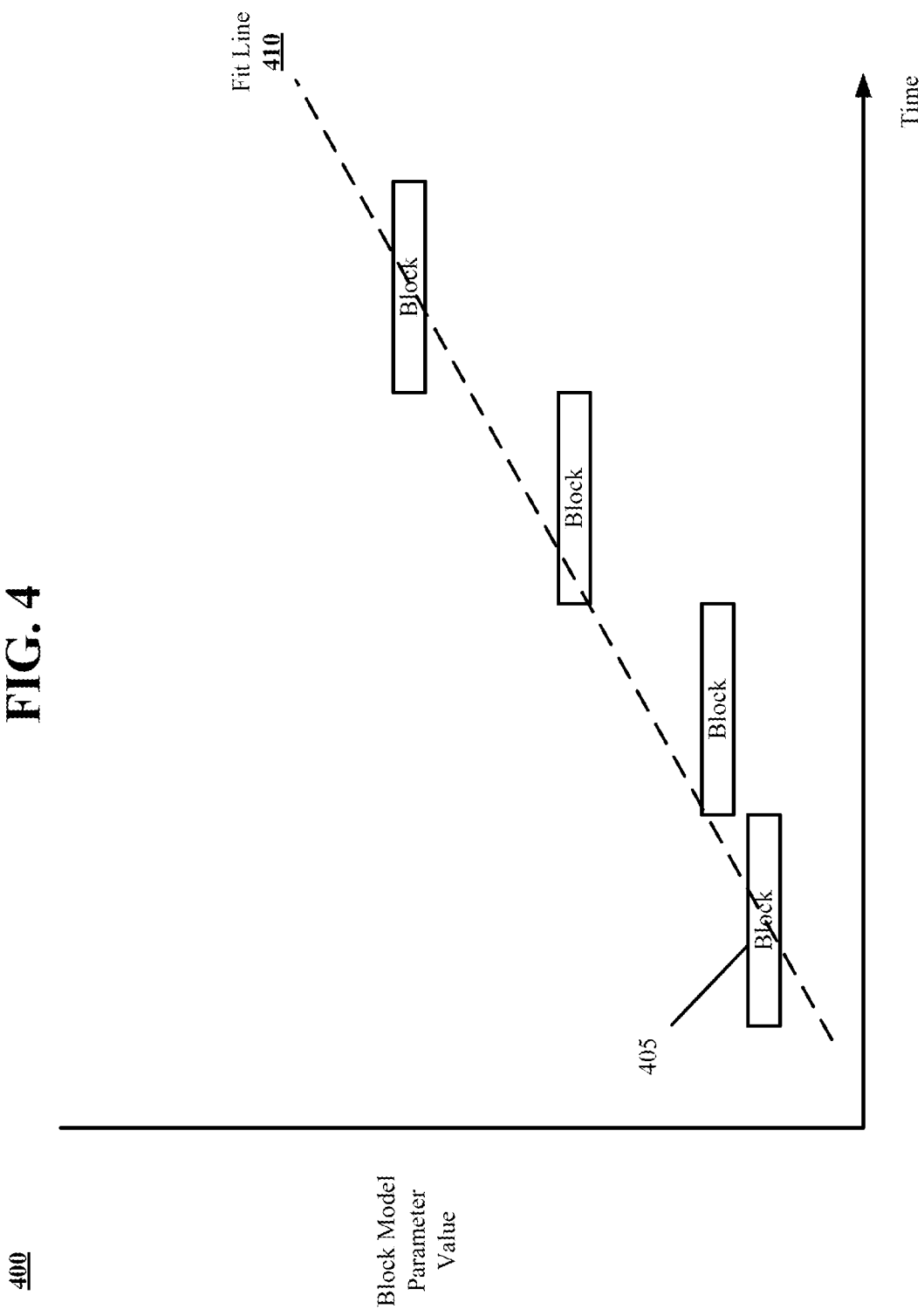

VEHICLE-BASED INTERVENTION BASED ON MODELING DRIVER PERFORMANCE

BACKGROUND AND SUMMARY OF THE INVENTION

Commercial vehicle drivers may perform repetitive driving tasks over prolonged durations in a sedentary position. Drivers may prefer to undertake most of the driving task at night, which may minimize traffic, but may conflict with the body's natural sleep cycle. Coupled with the effects of sleep loss and medication use, commercial vehicle drivers may become drowsy while driving.

Drowsiness may diminish alertness, reducing the ability of the driver to operate a vehicle safely and increasing the risk of an accident. Unlike drugs and alcohol, drowsiness may not be easily determined by diagnostic testing and may vary with changes in temperature, noise, and time of day. A driver may have difficulty assessing the extent of his or her own drowsiness prior to falling asleep behind the wheel.

According to an embodiment of the present subject matter, a method of performing a vehicle-based safety intervention includes receiving sensor data collected or generated by an onboard computing system of a vehicle, dividing the sensor data into a plurality of blocks, each of the blocks having a duration, applying a driver behavioral model to one or more of the plurality of blocks to generate one or more driver behavioral parameters, extracting a trend of the one or more driver behavioral parameters from the plurality of blocks, determining, based on the extracted trend, that a driver's performance when operating the vehicle is unsatisfactory or will be unsatisfactory in the future, and generating a vehicle-based intervention based on the determination that the driver's performance is unsatisfactory or will be unsatisfactory in the future. The driver behavioral model includes one or more of the driver's lateral behavior when operating the vehicle or the driver's longitudinal vehicle behavior when operating the vehicle. The driver's longitudinal behavior includes at least one of maintaining a predetermined distance from a leading vehicle, or maintaining an approximately same velocity as the leading vehicle. The one or more driver behavioral parameters include at least one of a delay value corresponding to a delay prior to the driver taking a corrective action, a corrective force proportional value corresponding to a magnitude with which the driver takes the corrective action, or a damping value corresponding to a modulation of the corrective action. The driver's lateral behavior includes maintaining an approximately central position of the vehicle in a driving lane. The method further includes identifying, based on the sensor data, a decreasing variance in the driver's head yaw over time or an increasing average (forward) pitch angle. The lateral behavior of the driver is characterized based on the sensor data generated by or collected from one or more of a steering angle sensor, a forward-facing camera, a lane departure warning system, or an acceleration sensor. The longitudinal behavior of the driver is characterized based on the sensor data generated by or collected from one or more of a throttle position sensor, an acceleration sensor, a brake pressure sensor, a forward-facing camera, or a forward distance sensor. The corrective action includes one or more of controlling an accelerator of the vehicle, controlling a brake of the vehicle, or controlling a steering control of the vehicle. The determination that the driver's performance is unsatisfactory or will be unsatisfactory in the future is based on two or more of the driver behavioral parameters meeting or exceeding a predefined threshold or boundary.

According to an embodiment of the present subject matter, a system of performing a vehicle-based safety intervention includes a processor, a memory in communication with the processor, the memory storing a plurality of instructions executable by the processor to cause the system to receive sensor data collected or generated by an onboard computing system of a vehicle, divide the sensor data into a plurality of blocks, each of the blocks having a duration, apply a driver behavioral model to one or more of the plurality of blocks to generate one or more driver behavioral parameters, extract a trend of the one or more driver behavioral parameters from the plurality of blocks, determine, based on the extracted trend, that a driver's performance when operating the vehicle is unsatisfactory or will be unsatisfactory in the future, and generate a vehicle-based intervention based on the determination that the driver's performance is unsatisfactory or will be unsatisfactory in the future. The driver behavioral model includes one or more of the driver's lateral behavior when operating the vehicle, or the driver's longitudinal vehicle behavior when operating the vehicle. The driver's longitudinal behavior includes at least one of maintaining a predetermined distance from a leading vehicle, or maintaining an approximately same velocity as the leading vehicle. The one or more driver behavioral parameters include at least one of a delay value corresponding to a delay prior to the driver taking a corrective action, a corrective force proportional value corresponding to a magnitude with which the driver takes the corrective action, or a damping value corresponding to a modulation of the corrective action. The driver's lateral behavior includes maintaining an approximately central position of the vehicle in a driving lane. The memory further includes instructions executable by the processor to cause the system to identify, based on the sensor data, a decreasing variance in the driver's head yaw over time or an increasing average forward pitch angle. The lateral behavior of the driver is characterized based on the sensor data generated by or collected from one or more of a steering angle sensor, a forward-facing camera, a lane departure warning system, or an acceleration sensor. The longitudinal behavior of the driver is characterized based on the sensor data generated by or collected from one or more of a throttle position sensor, an acceleration sensor, a brake pressure sensor, a forward-facing camera, or a forward distance sensor. The corrective action includes one or more of controlling an accelerator of the vehicle, controlling a brake of the vehicle, or controlling a steering control of the vehicle. The determination that the driver's performance is unsatisfactory or will be unsatisfactory in the future is based on at least two of the driver behavioral parameters meeting or exceeding a predefined threshold or boundary.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 illustrates an overview of a process to identify driver drowsiness in accordance with an embodiment of the present subject matter.

FIG. 4 is a chart showing the relationship between blocks of collected driver behavior data over time in accordance with an embodiment of the present subject matter.

DETAILED DESCRIPTION OF THE DRAWINGS

Figure 1:
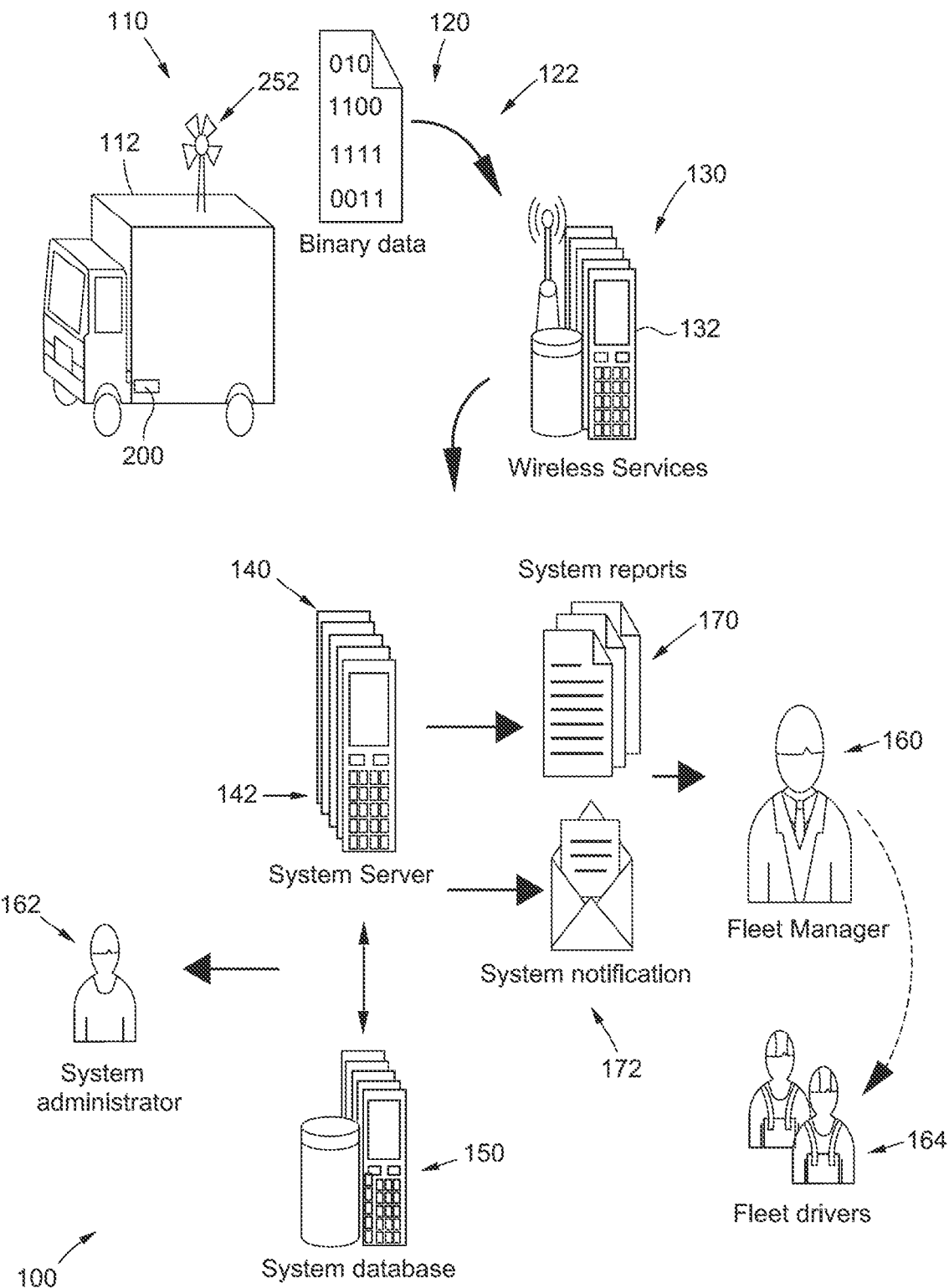
FIG. 1 is a diagram of an overview of a fleet management system in accordance with an embodiment of the present subject matter.

In the following description of the present subject matter, reference is made to the accompanying figures which form a part thereof, and in which is shown, by way of illustration, exemplary embodiments illustrating the principles of the present subject matter and how it may be practiced. Other embodiments can be utilized to practice the present subject matter and structural and functional changes can be made thereto without departing from the scope of the present subject matter.

For purposes of discussion, an example vehicle controlled by a driver may be a commercial truck. It should be appreciated that the example discussion should not be construed to limit the scope of the present subject matter. The present subject matter may be applicable to detecting driver drowsiness in a variety of vehicles, including automobiles, aircraft, boats, bicycles, and the like, so long as disclosed computing devices and associated sensing components may be outfitted to detect the driver's inputs and outputs, thus, allowing for the driver's behavior to be characterized.

Driving a vehicle, such as a commercial truck, may require a driver to perform lateral and longitudinal control of a vehicle. Lateral control may also be known as lane keeping, which refers to how well a driver maintains his or her vehicle's position within a given vehicle lane. Longitudinal control may refer to how well a driver can maintain his or her following distance from a leading vehicle ahead. Because a leading vehicle may not always be present, only lateral control may be continually required of the driver while operating the vehicle. The present subject may identify a driver's trend of lateral and/or longitudinal control to assess whether he or she is suffering from drowsiness and intervene once his/her performance has diminished to a threshold level.

It may be assumed that an increasingly drowsy driver may exhibit increased difficulty controlling the vehicle, which may manifest in a variety of ways. In the context of lateral control, for example, a drowsy driver may under correct and/or overcorrect using the steering wheel when attempting to restore the vehicle to a substantially central or desired lane position. In the context of longitudinal control, a drowsy driver may under correct and/or overcorrect using the accelerator and/or brake pedal(s) when attempting to restore a following distance or headway of a leading vehicle to a preferred following distance. In other words, the driver's corrections may be oscillatory, or non-proportional. A drowsy driver may also react more slowly and/or delay in correcting the lateral and/or longitudinal position of the vehicle. In another example, a drowsy driver may attempt to return the vehicle to the central lane position and/or attempt to return the vehicle to the preferred following distance but may never reach it or may reach it too slowly, which may be understood as a weak "corrective force." The system disclosed in accordance with the present subject matter may identify these time-varying parameters to use as a basis for determining the extent of a driver's drowsiness and to determine whether to intervene by carrying out subsequent action(s) in response.

FIG. 1 illustrates an overview of a vehicle data collection system 100 in accordance with an embodiment. In this example embodiment, a fleet of vehicles 110, such as trucks and cars, and particularly vehicles 112, may be configured with an event detection and reporting system 200 (see FIG. 2A), which may be an in-vehicle computing system that generates actual data relating to driving and vehicle events that may be of interest to a fleet manager 160 or another user. Such a system 200 may include, for example, a Lane Departure Warning (LDW) system 222 (FIG. 2A) that may generate signals indicative of an actual lane departure, such as lane wandering or crossing. Additionally, secondary systems to be described in greater detail below with reference to FIG. 2A may be carried by the vehicles or installed in the vehicle systems, include one or more video cameras, radar, lidar, transmission, engine, tire pressure monitoring and braking systems, for example, may generate additional safety event data and driver behavior data. Front facing cameras, radar and lidar-based system may also be used to provide data relating to driver behavior in the context of following distance, headway time, response to speed signs, and anticipation of needed slowing.

With continued reference to FIG. 1, event data 120 may be selectively sent via communication links 122 to network servers 132 of one or more service providers 130. Communication service providers 130 may utilize servers 132 (only one shown for ease of illustration) that collect data 120 provided by the vehicles 112. Event data 120 may include events that occur on a vehicle 110 during deviant or irregular driving behavior, such as when a driver 164 veers from his/her lane, causing a lane departure warning (LDW), changing lanes without a turn signal, following a forward vehicle too closely (forward collision warning; FCW), excessive braking, and the like. In general, vehicle events that generate event data 120 may be caused, directly and/or indirectly, by actions of the driver 164. The event detection and reporting system 200 may collect sensor data from pertinent sensors when vehicle events occur on equipped vehicles 112. If safety systems are not working correctly, the event data 120 transmitted from the affected vehicle 112 may appear unusual when compared with a population distribution of the data from the vehicle fleet 110. Accordingly, statistical vehicle event data, such as the rate of occurrence of one or more the vehicle event(s) for the vehicle fleet 110 may be used as a basis for determining whether a vehicle 112 has one or more issues, especially if a driver incurs different numbers of vehicle events, on average, when operating other vehicles.

One or more servers 140 of the vehicle data collection system 100 may be configured to selectively download, receive, or otherwise retrieve data either directly from the vehicles 112 via the service providers 130 or from collection servers 132 which may be third party servers from one or more various telematics suppliers or cellular providers. Servers 140 may be configured to initiate processing of the event data in manners to be described in greater detail below.

A web application 142 executable on the one or more servers 140 of the vehicle data collection system 100 may include a dynamic graphical user interface for fleet managers 160 and administrators 162 to view all the information once it is processed. The vehicle data collection system 100 of the example embodiment may also include one or more databases 150 configured to selectively store all event information provided from the vehicles 112 in the fleet 110 for one or more designated time intervals, including raw and post-processed trip data.

In accordance with the example embodiment, the system administrators 162 may be users who are provided with interfaces to configure and manage fleets, monitor platform performance, view alerts issued by the platform, and view driver and event data and subsequent processing logs and/or views. Fleet managers 160 may view event information for their respective fleet for internal processing. These events may arrive via user-initiated reports 170/335 in the web application 142 executable on the one or more servers 140, or via email or other notifications 172. Fleet managers 160 may, depending on internal policies and processes or for other reasons, also interface with individual drivers 164 regarding performance goals, praise, incentivization, corrections, reports, or coaching. The fleet managers 160 may also receive data regarding the routes the fleet vehicles are using.

Figure 2A:
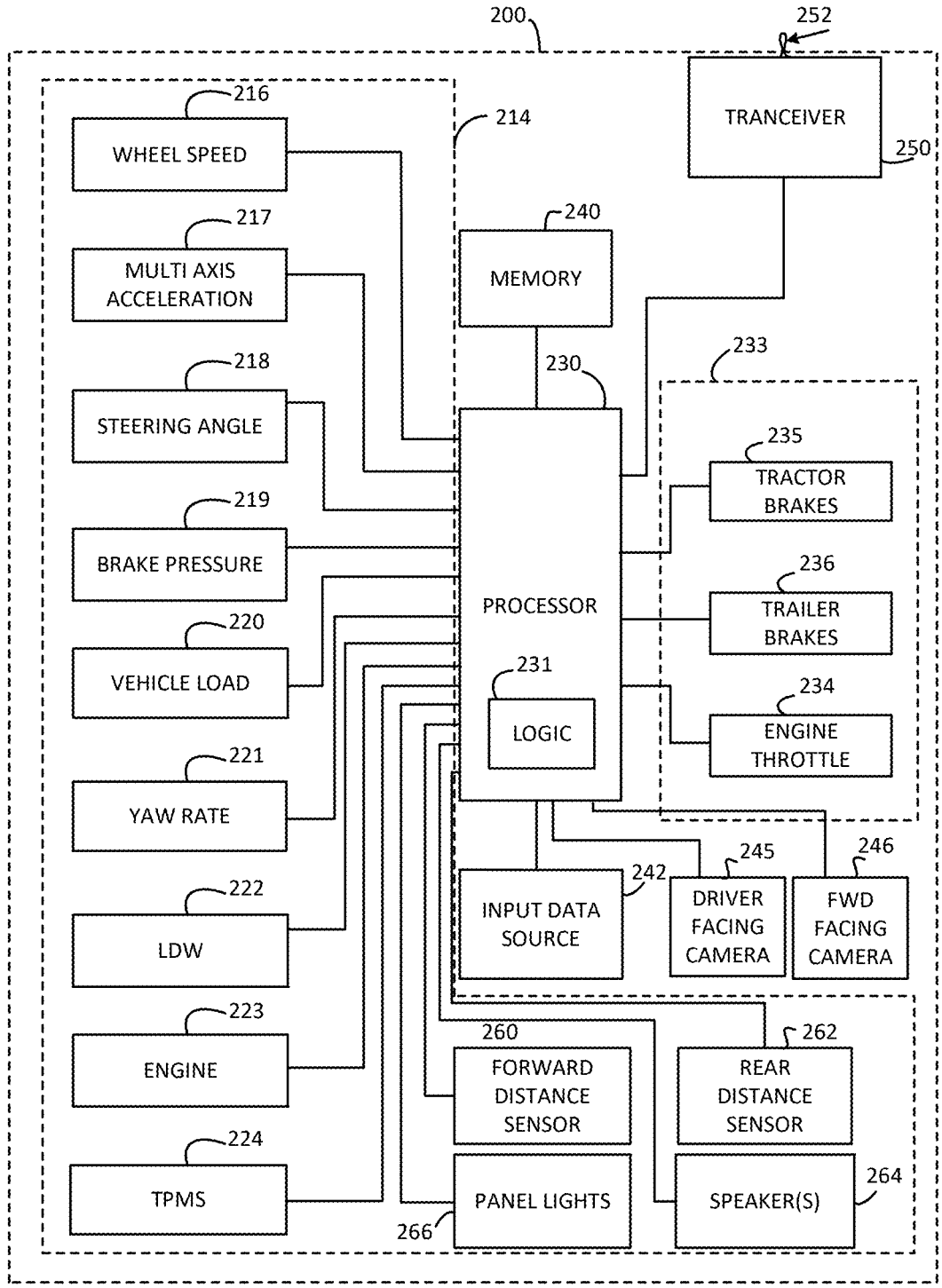
FIGS. 2A and 2B are block diagrams illustrating an embodiment of a vehicle-based computer system in accordance with an embodiment of the present subject matter.

Referring now to FIG. 2A, depicted is a schematic block diagram that illustrates details of an event detection and reporting system mentioned above, and which is configured to be used in accordance with an embodiment of the present subject matter. As further detailed below, the in-vehicle event detection and reporting system 200 may be adapted to detect a variety of operational parameters and conditions of the vehicle 112 and the driver's interaction therewith and, based thereon, to determine if a driving or vehicle event has occurred (e.g., if one or more operational parameter/condition thresholds has been exceeded). Data related to detected events (i.e., event data), such as safety events, as well as the routes, lanes, and locations, timestamps, other vehicle sensor data, such as tire pressure from the TPMS system, speed, and any other data provided by the systems and sensors in FIG. 2A may then be stored and/or transmitted to a remote location/server, as described in more detail below. In an embodiment, the data may be transmitted to a remote server as early as possible, including whenever connectivity to a data network, such as a cellular data network or Wi-Fi data network, is available. Frequently transmitting the vehicle event data to the remote server may allow for a real-time or near real-time monitoring of driver performance and route difficulties. For instance, a driver that begins causing generation of vehicle events frequently within a recent time period may be suspected as being tired, suffering from illness, or even intoxicated. Similarly, if one or more drivers traversing a route or route section suddenly begins exhibiting more vehicle events than a normal or baseline amount, it may be indicative of a hazard on the route, such as construction, debris, a collision, a reduced number of lanes, and the like. Upon making this determination, further vehicle event, sensor, and/or system data may be retrieved, compared, and/or cross examined to confirm a more precise cause. For example, an excessively slow travel speed through a route section may cause the system to analyze the temperature and weather data conditions either from the vehicle 112 and/or other local weather data servers to assess whether the road may be icy or covered with snow. Similarly, images or video captured using any of the cameras 245/246 while a vehicle 112 is traversing through a route or route section determined to possibly contain a hazard, which may be transmitted to a remote server and subsequently to the fleet manager 160 and/or dispatching software, which may be programmed to dynamically assign or re-assign drivers to an alternate route or route section to avoid the identified hazard.

The event detection and reporting system 200 of FIG. 2A may include one or more devices or systems 214 for providing input data indicative of one or more operating parameters or one or more conditions of a commercial vehicle 112. It should be appreciated that vehicle devices, systems, and subsystems 214 may include additional as well as fewer devices, systems, and subsystems than those shown in FIG. 2A. Alternatively, the event detection and reporting system 200 may include a signal interface for receiving signals from the one or more devices or systems 214, which may be configured separately from the system 200. For example, the devices 214 may be one or more sensors, such as but not limited to, one or more wheel speed sensors 216, one or more lateral/longitudinal acceleration sensors/accelerometers, such as multi-axis acceleration sensors 217, a steering angle sensor 218, a brake pressure sensor 219, one or more vehicle load sensors 220, a yaw rate sensor 221, a lane departure warning (LDW) sensor or system 222, one or more engine speed or condition sensors 223, and a tire pressure (TPMS) monitoring system 224. The event detection and reporting system 200 may also utilize additional devices or sensors in the exemplary embodiment including for example a forward distance sensor 260 and a rear distance sensor 262 (e.g., radar, lidar, etc.). Other sensors and/or actuators or power generation devices or combinations thereof may be used of otherwise provided as well, and one or more devices or sensors may be combined into a single unit as may be necessary and/or desired.

The event detection and reporting system 200 may also include instrument panel lights 266 and speaker(s) 264, which may be usable to provide headway time/safe following distance warnings, lane departure warnings, and warnings relating to braking and or obstacle avoidance events.

The event detection and reporting system 200 may also include a logic applying arrangement such as a controller or processor 230 and control logic 231, in communication with the one or more devices or systems 214. The processor 230 may include one or more inputs for receiving input data from the devices or systems 214. The processor 230 may be adapted to process the input data and compare the raw or processed input data to one or more stored threshold values or desired averages, or to process the input data and compare the raw or processed input data to one or more circumstance-dependent desired value. The processor's 230 role may be to process input and outputs regarding safety, warning, or indication systems of the vehicle 112 and may be distinct from other onboard vehicle 112 processors that perform tasks such as controlling the ignition timing, obtaining measurements from a mass airflow sensor (MAF), pulsing fuel injectors, and the like. Processor 230 may communicate with other vehicle 112 processors via a vehicle data bus, such as a Controller Area Network (CAN bus), for example.

The processor 230 may also include one or more outputs for delivering a control signal to one or more vehicle systems 233 based on the comparison. The control signal may instruct the systems 233 to provide one or more types of driver assistance warnings (e.g., warnings relating to braking and or obstacle avoidance events) and/or to intervene in the operation of the vehicle 112 to initiate corrective action. For example, the processor 230 may generate and send the control signal to an engine electronic control unit or an actuating device to reduce the engine throttle 234 and slow the vehicle 112 down. Further, the processor 230 may send the control signal to one or more vehicle brake systems 235, 236 to selectively engage the brakes (e.g., a differential braking operation). A variety of corrective actions may be possible and multiple corrective actions may be initiated at the same time.

The event detection and reporting system 200 may also include a memory portion 240 for storing and accessing system information, such as for example, the system control logic 231. The memory portion 240, however, may be separate from the processor 230. The sensors 214 and processor 230 may be part of a pre-existing system or use components of a pre-existing system.

The event detection and reporting system 200 may also include a source of input data 242 indicative of a configuration/condition of a commercial vehicle 112. The processor 230 may sense or estimate the configuration/condition of the vehicle 112 based on the input data, and may select a control tuning mode or sensitivity based on the vehicle configuration/condition. The processor 230 may compare the operational data received from the sensors or systems 214 to the information provided by the tuning.

In addition, the event detection and reporting system 200 may be operatively coupled with one or more driver-facing imaging devices, shown in the example embodiment for simplicity and ease of illustration as a single driver facing camera 245 that may be trained on the driver and/or trained on the interior of the cab of the commercial vehicle 112. However, it should be appreciated that one or more physical video cameras may be disposed on the vehicle 112 such as, for example, a video camera on each corner of the vehicle 112, one or more cameras mounted remotely and in operative communication with the event detection and reporting system 200 such as a forward-facing camera 246 to record images of the roadway ahead of the vehicle 112. In the example embodiments, driver data may be collected directly using the driver facing camera 245 in accordance with a detected driver head position, hand position, or the like, within the vehicle being operated by the driver. In addition, driver identity may be determined based on facial recognition technology and/or body/posture template matching.

The event detection and reporting system 200 may also include a transmitter/receiver (transceiver) module 250 such as, for example, a radio frequency (RF) transmitter including one or more antennas 252 for wireless communication of the automated control requests, GPS data, one or more various vehicle configuration and/or condition data, or the like between the vehicles 112 and one or more destinations such as, for example, to one or more services (not shown) having a corresponding receiver and antenna. In an example, transceiver may communicate cellularly using its antenna 252 over a cellular telephone network with a cloud-based computing system. The cloud computing system may be implemented, for example, by one or more servers 140, and/or servers 132. The transmitter/receiver (transceiver) module 250 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 230 may be operative to combine selected ones of the collected signals from the sensor systems described above into processed data representative of higher-level vehicle condition data such as, for example, data from the multi-axis acceleration sensors 217 may be combined with the data from the steering angle sensor 218 or forward-facing camera 246 to determine excessive curve speed event data. Other hybrid event data relatable to the vehicle 112 and driver of the vehicle 112 and obtainable from combining one or more selected raw data items from the sensors includes, for example and without limitation, excessive braking event data, excessive curve speed event data, lane departure warning event data, excessive lane departure event data, lane change without turn signal event data, loss of video tracking (LOVT) event data, LDW system disabled event data, distance alert event data, forward collision warning event data, haptic warning event data, collision mitigation braking event data, ATC event data, ESP event data, RSP event data, ABS event data, TPMS event data, engine system event data, average following distance event data, average fuel consumption event data, average ACC usage event data, and late speed adaptation (such as that given by signage or exiting).

The event detection and reporting system 200 of FIG. 2A may be suitable for executing embodiments of one or more software systems or modules that perform vehicle brake strategies and vehicle braking control methods according to the subject application. The example event detection and reporting system 200 may include a bus or other communication mechanism for communicating information, and a processor 230 coupled with the bus for processing information. The computer system includes a main memory 240, such as random-access memory (RAM) or other dynamic storage device for storing instructions and loaded portions of the trained neural network to be executed by the processor 230, and read only memory (ROM) or other static storage device for storing other static information and instructions for the processor 230. Other storage devices, such as flash, may also suitably be provided for storing information and instructions as necessary or desired.

Instructions may be read into the main memory 240 from another computer-readable medium, such as another storage device of via the transceiver 250. Execution of the sequences of instructions contained in main memory 240 may cause the processor 230 to perform the process steps described herein. In an alternative implementation, hard-wired circuitry may be used in place of or in combination with software instructions to implement the present subject matter. Thus, implementations of the example embodiments are not limited to any specific combination of hardware circuitry and software.

Figure 2B:
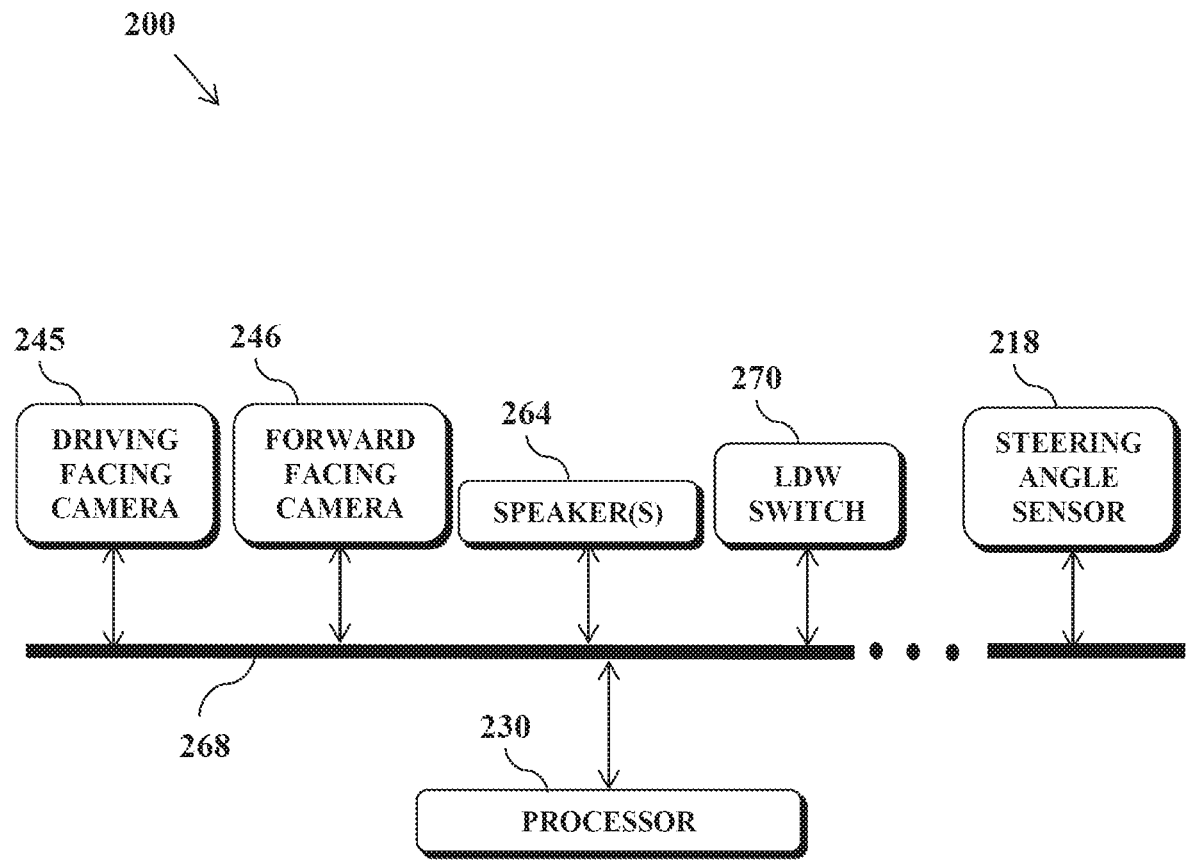

Referring now to FIG. 2B, only certain components of the event detection and reporting system 200 of FIG. 2A are depicted. As shown, various components of the system 200 are shown as being in communication with processor 230 by being connected to a vehicle bus 268, which can be a private bus dedicated to the system 200 or a general vehicle bus, CAN bus, and the like. As shown, in addition to DFC 245, FFC 246, speaker(s) 246 and steering angle sensor 218, an LDW switch 270 may also be shown as being in communication with processor 230 via bus 268. LDW switch 270 may be a component provided in the interior of a vehicle by which the driver can legitimately switch off the LDW system 222 on a temporary basis. This functionality may be provided so that drivers 164 can temporarily avoid receiving repeated unwarranted warnings due to certain unusual road conditions, such as passing through a construction area where lanes are significantly narrowed, rendering it impossible or very difficult to otherwise avoid setting off the LDW system 222.

Referring to the components of FIG. 2B by way of example only, processor 230 may read and/or generate DTCs based on the malfunction of the attached systems and sensors connected via the vehicle bus(es) shown in FIGS.

2A and 2B, for example. Processor 230 may also generate DTCs based on detected faults of its own, such as when it fails to read/write to/from a memory such as memory 240, an external memory card, or a memory-mapped I/O device, such as a display. In one example, the processor 230 may read DTCs, decode the DTCs, and transmit them using the transceiver 250 via a cellular connection to servers 132, servers 140, or a cloud-based system.

FIG. 3 shows an overview of a process 300 to identify driver drowsiness. Process 300 may be executed on one or more computing systems, such as one or more of servers 132, servers 140, a cloud-based system, the event detection and reporting system 200, or another processor-based system of the vehicle 112, and the like, which include processors capable of executing instructions stored in a non-transitory computer readable medium. As used herein, whenever an act is described to be performed by "the system," it may" refer to one or more of servers 132, servers 140, or the cloud-based system previously discussed. Process 300 may be executed iteratively, in parallel with other tasks or processes, and/or in continuously repeating. In S301, process 300 may collect driver behavior data as it relates to the driver's lateral and longitudinal performance. The data may be collected from the event detection and reporting system 200 within the vehicle 112 that the driver 164 is operating. The collected data may include or be based on vehicle event data generated within the event detection and reporting system 200 by systems, subsystems, sensors, and other vehicle components as shown in FIGS. 2A and 2B. For instance, and as previously described, the event detection and reporting system 200 may capture braking, acceleration, and/or steering event data from one or more of a variety of sensors, such as the multi-axis acceleration sensor 217, steering angle sensor 218, forward distance sensor 260, lane departure warning sensor 222, driver facing camera 245, forward facing camera 246, and brake pressure sensor 219. Vehicle event data of this type may be stored in the form of records in system database 150, servers 132, servers 140, or a cloud computing and storage system.

The collected driver behavior may be divided into blocks in S302. In an embodiment, the block size may be of any predetermined duration, such as 1 minute, 5 minutes, 10 minutes, 15 minutes, 20 minutes, 25 minutes, 30 minutes, and the like. In an embodiment, each block may be defined by one or more of a length, a start time, or an end time. In general, a block of greater duration may contain greater amounts of behavioral data and thus, provide greater immunity to noise and greater certainty of an identified behavior than a block of lesser duration. On the other hand, a block of shorter duration may allow the system an opportunity to respond and intervene more frequently. Blocks may also be overlapping; for instance, a first block may extend from 12:00 p.m. to 12:30 p.m. while a second, consecutive block may extend from 12:15 p.m. to 12:45 p.m. In this way, the certainty associated with a longer, 30-minute block duration may be balanced with the increased system responsiveness of a 15-minute block duration.

In S303, a driver behavior model may be fitted to each individual block of data. This step may be known as "system identification" because it identifies the system parameters that may lead to the observed driver behavioral data. A driver behavior model may be matched to each block based on constraints and initial values. The matched driver behavior model may produce three system parameter values based on the data of the driver behavior block, including "corrective force," "damping," and "delay." These three system parameter values may be plotted as a point in three-dimensional space for each block of collected data to generate a plurality of points. Excessive delay may mean not reacting soon enough. Insufficient corrective force, in the case of braking, may mean the driver does not slow down sufficiently to avoid a collision, or not manipulate the steering wheel sufficiently to avoid hitting a median or barrier. Insufficient damping may mean the driver's overall control is sloppy, jerky, or otherwise not well-modulated.

In S304, a trend-over-time model may be fitted to the plurality of points. The trend-over-time model may be analyzed to determine how the behavior of the driver is changing with time. For instance, analyzing the trend-over-time model may reveal that the driver's reaction time (i.e., delay parameter) is increasing over a previous given number of blocks, that the driver is correcting his or her longitudinal and/or lateral position less forcefully/more slowly, or that the driver's corrective acts seem to oscillate before finally reaching the desired operating point, such as the desired velocity/relative velocity, distance from a leading vehicle, and/or lane position. In S305, the system may evaluate whether the driver's pattern of behavior, based on the trend-over-time model, exhibits unsatisfactory performance, and/or predicts unsatisfactory performance in the near future. The evaluation in S305 may include determining whether one or more of the three parameter values, or any combination thereof, are currently exceeding a predetermined threshold or whether it is likely that one or more of the three parameter values will exceed a threshold in the future based on extrapolation. If not, process 300 returns to S301 to continue accumulating blocks of driver behavior data.

FIG. 4 illustrates a two-dimensional chart 400 to show the relationship between blocks of driver behavior over time. In an example embodiment, each block 405 may be 30 minutes in length and may not overlap with the other blocks, although overlapping blocks are also possible and may be preferred in some instances. The fit line 410 may provide a smoothed estimate of the current delay, corrective force, and damping values across all collected blocks of driver behavior data, which may be evaluated. The fit line 410 may also be used to extrapolate future blocks, thus predicting future driver performance. It should be appreciated that because each block 405 may be defined by the three system parameter values in addition to a timestamp or block identifier, each block may be preferably and equivalently represented in four dimensions, which may not be reproduced visually on a two-dimensional page. Nevertheless, a plurality of blocks 405, even when defined by four or more dimensions, may be extrapolated from to determine a trend from which future blocks 405 may be predicted. These predicted blocks may be used to determine whether the system will cause one or more acts of intervention to be carried out, as will be subsequently described.

Figure 5:
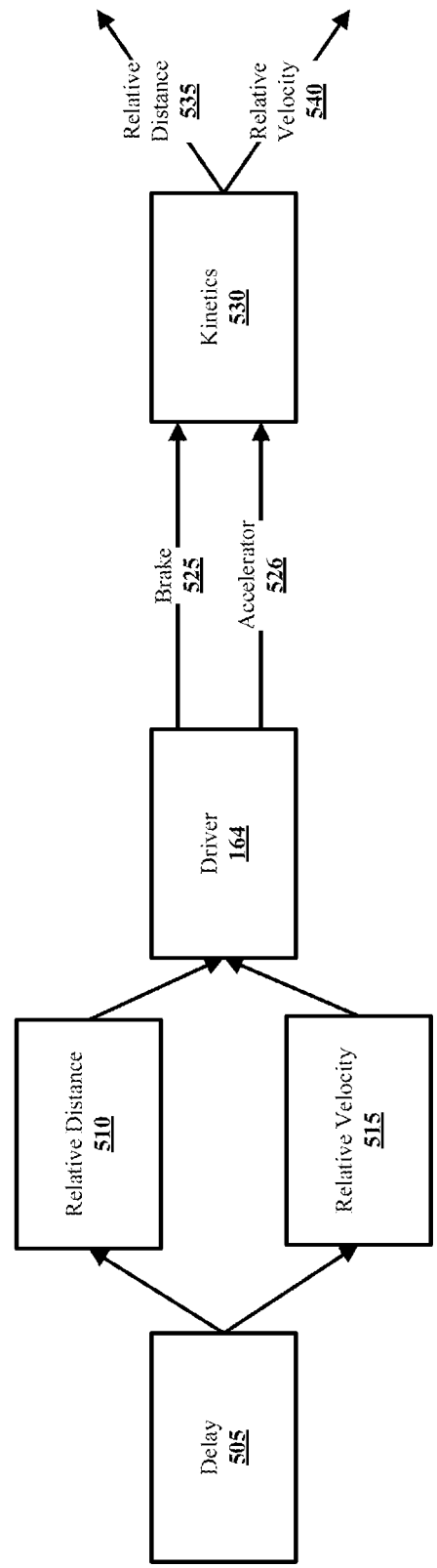
FIG. 5 is a control model of the driver behavior as it relates to longitudinal control of a vehicle in accordance with an embodiment of the present subject matter.

FIG. 5 illustrates a control model 500 of the driver behavior as it relates to longitudinal control. The delay 505 may increase for a driver 164 as he or she becomes drowsier. The relative distance 510 and relative velocity 515 between the vehicle 112 and a leading vehicle may be considered inputs to the driver 164. In this example model 500, the driver 164 may be understood to wish to continue following the leading vehicle at a fixed headway or following distance. As such, the driver 164 may prefer for the relative velocity 515 to be approximately zero, such that the vehicle 112 and the leading vehicle are traveling at approximately the same velocity, and may prefer for the relative distance 510 to be substantially maintained at the desired following distance. The desired following distance may correspond to a rule of thumb, for example, such as three seconds of following distance, or a distance of one vehicle length for every speed increase of ten miles per hour. In response to determining that one or both of the relative distance 510 or the relative velocity 515 do not meet the driver's preferences, he or she may vary the pressure applied to the brake 525 and/or accelerator 526. Doing so may cause the kinetics 530 of the vehicle 112 to change, resulting in a new relative distance 535 and new relative velocity 540.

A numerical optimization procedure may be applied to find the delay 505, and the driver behavioral parameters, including corrective force and damping, that best match each block's data. The plurality of distance and speed measurements acquired in a single block may be numerically coupled together with the system identification procedure previously discussed to produce the corrective force, damping, and delay values. The driver's corrective force may be described as the magnitude or force with which he or she makes corrections to the following distance and relative velocity (longitudinal behavior) and/or lane position (lateral behavior). For instance, a driver 164 that applies a larger acceleration pedal movement as detected by a throttle position sensor, accelerometer 217, or applies a larger brake pedal movement, as detected by the brake pressure sensor 219, may be understood to exhibit a greater corrective force. A driver's damping may be understood as a decrease in the speed of oscillation and/or the feathering or modulation that occurs when making corrections to the following distance and/or lane position. For example, in the context of lateral behavior, a driver 164 that veers from the center of the lane, as detected by the LDW system 222 or forward-facing camera 246, may turn the steering wheel in one direction, as detected by the steering angle sensor 218 to correct the lane position, but in fact, may overcorrect and subsequently turn the steering wheel in the opposite direction. The oscillation of the steering wheel may be understood as a lack of damping and would exhibit a lower damping parameter value than a driver that exhibits little or no oscillation. In an embodiment, a driver 164 whose corrections exhibit infinite oscillation may exhibit a damping parameter value of zero. The degree of oscillation may be detected by the event detection and reporting system 200 using the steering angle sensor 218, forward-facing camera 246, LDW system 222, and/or multi-axis acceleration sensor 217. The variation in the driver behavioral parameters (delay, corrective force, damping) may be determined where a worse, or less well-matched optimization value is produced to gauge the uncertainty for the delay 505, corrective force, and damping. The uncertainty may be understood as the uncertainty of the slope and y-intercept of a best fit line drawn to a plurality of blocks defined by the parameter values and/or time. The uncertainty of the slope of a best fit line may be, for instance, one-half of the difference between a maximum and minimum slope of the best fit line, where "best fit" means that the sum of the vertical line distances between the line and each point, also known as the residual or the error, is minimized.

Each block, once subjected to the numeric optimization procedure, may produce a best-fit triplet (delay, corrective force, damping). Constraints and initial values for the delay, corrective force, and damping may be applied for the numeric optimization procedure. These constraints and initial values may be both physical and observational. The constraints, for example, may be delay >=0, damping >0, and corrective force >0. The initial values, for example, may be delay=1.0 seconds, damping=0.4, and corrective force=0.1. Each initial value may be selected based on a default or average value for a typical driver, which may reduce the number of blocks that need to be collected before extrapolation can take place. Each block may ignore the time in which its own interval (e.g., within a period of 30 minutes) takes place. Once each the delay, damping, and corrective force values are determined for a block, a time value may also be added. By having multiple blocks, the time of each block may be nevertheless accounted for in a coarse sense, since the fit line 410 may be fitted to a series of constant value blocks. Each block's results may be condensed into a single three- or four-dimensional point, as previously discussed based on the three system parameter values and a time value. Furthermore, the blocks' starting and ending times may be moved by a half-interval duration or other fractional interval duration, such that the blocks overlap, to arrive intermediate values for delay, damping, corrective force, and time, yielding finer granularity. The fitting and detection of the trend line may utilize a variety of techniques to produce the quadruplet output result. The temporal interval of each block may be selected such that it is long enough to collect enough data to reduce noise yet short enough to yield a system that responds within a reasonable amount of time to detect driver drowsiness.

A four-dimensional curve-fitting procedure may be applied to the collection of four-dimensional points (defined by delay, damping, corrective force, and time) produced by applying the driver behavioral model(s) to the plurality of blocks, including their uncertainties. Curve fitting may be performed on the collected damping, delay, corrective force, and time values from each of the plurality of blocks. The curve fitting can also account for the uncertainties in these values. For instance, each block may have an uncertainty range for damping, delay, and corrective force, given as those bounds that worsen the sum of the residuals. More uncertain blocks may be more forgiving or tolerant of how close the fit line is to them, whereas highly-certain blocks may prefer the fit line or curve pass closely by.

The curve fitting may be achieved, for example, by a least-squares procedure with unequal (uncertainty) sigma values for each input point. The curve fitting procedure may produce a parametrized model for the evolution of delay, damping, and corrective force as a function of time. Including the current time into the parametrized model may produce a smoothed, current estimate of delay, damping, and corrective force, as well as the associated uncertainty for each value. If any of the triplet values meet or exceed a threshold indicating current or future poor performance in S305, such as a delay of five seconds, the system may intervene in S306. Because each block may be adaptive to the driver behavioral data within it, the system may adapt to each individual driver's propensities. For example, drivers may differ in how much delay, also known as reaction time, that they exhibit. One driver may have a mediocre, relatively-lengthy reaction time, but then may compensate for it by crisply correcting by the correct amount of braking, steering, etc., with little or no oscillation. This may occur, for example, if the driver is wide awake but looking away from the road and suddenly needs to make a correction, which the driver performs well. Alternatively, a driver may have a relatively quick reaction time but perform a correction poorly in a sluggish, imprecise manner, which may reflect in poor lane keeping and/or maintenance of a following distance to a leading vehicle.

As previously discussed, the system may intervene when any of the three parameter values exceed a predetermined threshold. The system may also intervene when the combination of any two or all three parameters (delay, damping, and corrective force) exceed a multidimensional bound, wherein the individual contributions of each parameter value do not exceed a respective predetermined threshold. For example, both the delay and the corrective force values may be below their respective thresholds but when combined yield an unsafe driver condition based on crossing the multidimensional bound. The system may also intervene when the trend-over-time model (i.e., fit line 410) predicts the driver 164 may soon be performing at an unacceptably poor level, based one extrapolation of the current behavior blocks. For example, extrapolation may be performed for one or more subsequent block intervals, such as three 30-minute intervals. If any extrapolated parameter of the delay, damping, and corrective force parameters exceeds a predetermined threshold, the system may intervene.

Whether or not a combination of two parameters and/or the trend-over-time model suggests an unsafe condition may be based on prior incidents of collision mitigation braking and other, similar, extreme driver 164 reactions. It may be assumed that a driver performing with too much delay, poor damping, and/or insufficient corrective force will cause the event detection and reporting system 200 to generate vehicle events, such as lane departure warnings, collision mitigation braking events, and the like. A collision mitigation braking event, for example, may be determined by the event detection and reporting system 200 based on a combination of sensor data, such as one or more of the brake pressure sensor 219, the multi-axis acceleration sensor 217, the forward-facing camera 246, or the forward distance sensor 260. At the time they occur, or within a relevant window of time in which they occur, these generated vehicle events may be associated with the delay, damping, and corrective force parameter values that the driver was exhibiting during the same time/time window. Thus, the vehicle events generated by the event detection and reporting system 200 may be used to effectively determine the parameter values that may be considered detrimental for an individual driver. For instance, a given reaction time may cause one driver to perform poorly and generate vehicle safety events while the same reaction time may have little or no effect on another driver's performance. Based on the driver's vehicle event history and the corresponding coincidental parameter values, the previously-described predetermined threshold values for one or more of the parameter values may be established for each driver. These threshold values may be stored in association with the driver identity and may be used when the same driver is using a different vehicle or when considering which driver may perform best under different conditions. The predetermined threshold value associated with safety-related vehicle events that occur may be determined using classification algorithms known in the art, such as linear discriminants, neural networks, support vector machines, and the like. Once a driver's behavior has entered into the parameter space where vehicle safety events typically occur, based on historical driver data, they may be warned via intervention measures or other actions by the system may be taken.

Figure 6:
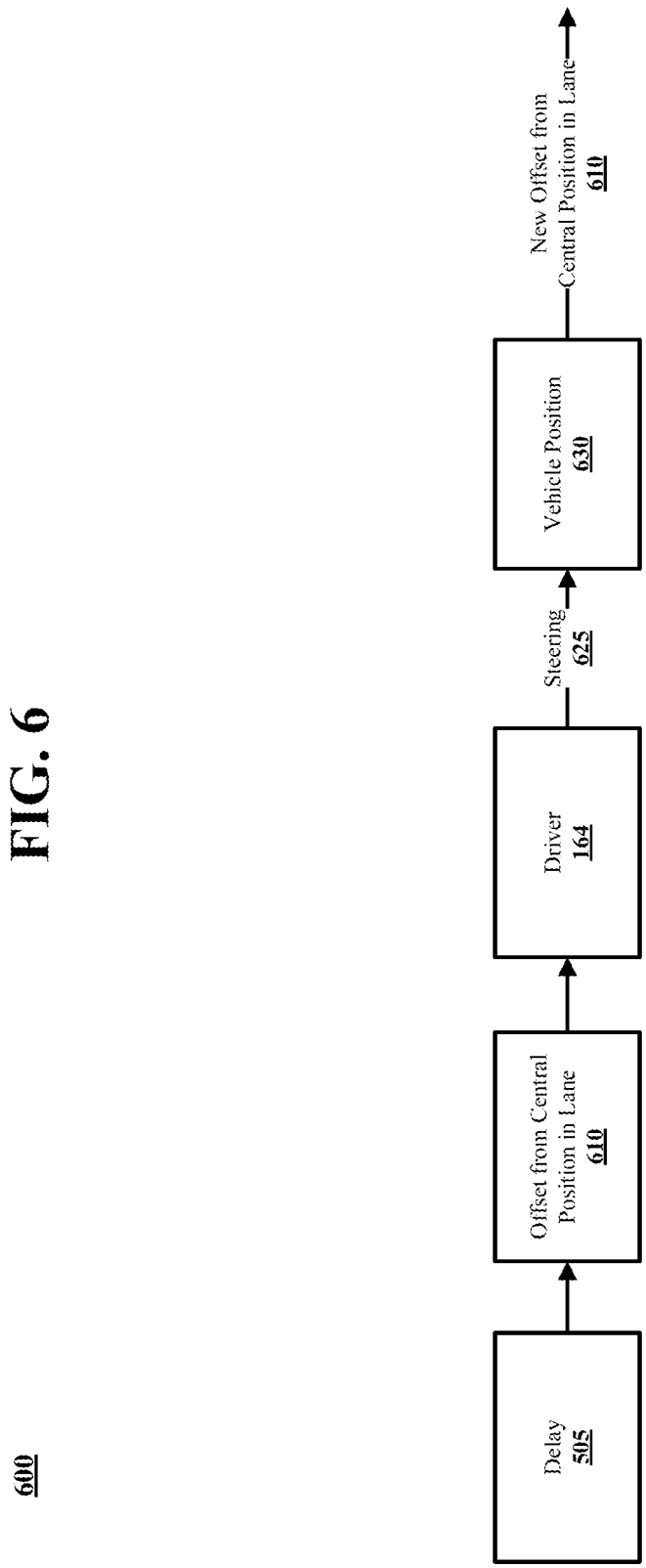
FIG. 6 is a control model of driver behavior as it relates to lateral control of a vehicle in accordance with an embodiment of the present subject matter.

FIG. 6 illustrates a control model 600 of the driver behavior as it relates to lateral control, also known as lane keeping. The delay 505 may be substantially the same as in the discussion of FIG. 5, increasing as a driver 164 as he or she becomes drowsier. The offset of the vehicle 112 from the central position in the lane 610 based on left and right lane markings, yaw angles to the left and right lane markings, road curvature, and vehicle speed may be considered an input to the driver 164 and may be may be continuously collected using the forward-facing camera 246, lane departure warning sensor 222, or other lane-marker identification sensor(s). It may be assumed that the driver 164 may wish to maintain his or her vehicle 112 substantially centered in the driving lane. In response to determining that his or her vehicle 112 has veered from the central lane position, the driver 164 may manipulate the steering wheel, as detected by the steering angle sensor 218. Doing so may cause the vehicle's lane position 630 to be adjusted, resulting in a new offset from the central lane position 635. Because it may be necessary in certain situations for the driver 164 to veer from the central lane position, such as while making sharp turns, passing, or changing lanes, the offset from the central lane position 610 may be ignored or the collection of lateral driver behavior data may be postponed during these situations. These situations may be detected from a small radius of curvature (e.g., seen by the forward-facing camera 246, and/or confirmed by lateral acceleration using the multi-axis accelerometer 217) and/or by beginning to and then continuing to cross lane markings (e.g., using the forward-facing camera 246). Alternatively, or in addition, lane markings may vary in location or disappear altogether. Thus, these situations may be considered outliers in the collected data and may not be considered in the drowsiness determination performed by the system. The removal of outlier data may be limited to a maximum time per removed episode, and the episodes may not be contiguous. For instance, during a lane change episode, data collection may be restricted during at most 20 seconds, this being the maximum time that a lane change is deemed to possibly take. Naturally, other lane change durations are possible. When reference objects, such as lane markings, objects, guard rails, or other vehicles ahead are not present, data collection may be suspended until one or more of these reference objects return. Alternatively, or in addition, data generated by one sensor or system may be recognized by the system and used as a basis to disable another sensor or system. For instance, when the steering angle sensor 218 and/or forward-facing camera 246 indicates that the driver is making a sharp turn, the lane departure warning system and associated sensors 222 may be disabled in response.

The collected behavioral data stream, once free of outlier data, may be provided to the system to learn the relationships between lane position and driver action, as previously described with reference to S303. Conventional dynamic system identification methods may be used, such as stochastic gradient descent for a neural network, or any other technique that can model the relationship sufficiently. Once the relationship between the lane position and the driver 164 has been modeled in the form of a lateral dynamics network, the system may attempt to answer the question, "Will the driver respond quickly enough?" To answer this question, the system may determine the step response time. Step response may refer to how a system or driver responds to a stimulus. For instance, when a child's ball suddenly rolls out in the street in front of a driver, this is a "step"; i.e., a sudden change of environmental state. The "response" may refer to how the driver responds, that is, quickly enough (delay), forcefully enough (corrective force), and with proper braking modulation (damping) to avoid, for example, sliding on wet pavement. In the case of a neural network, a synthetic step may be input to the learned lateral dynamics network to determine the delay in responding. The system may consider what is happening now; e.g., how fast the vehicle is traveling, the distance to the lane marking or vehicle ahead, the yaw angle with respect to the lane marking, the curve radius of a turn, and the recent history of these values to determine how to react. This collection of current and past values may be input to a neural network with the output being a sensor output, such as the steering wheel angle at the next time instant. That is, the neural network may learn to predictively replicate how the driver reacts with time, using a prior time interval to predict a current value. Once the quality of the neural network's predictive replication quality is reasonably good, as measured by percentage error or accumulated percentage error over a time interval, it may be considered a model of the driver. The advantage of the neural network's generated driver model may be that any input (e.g., a step function) may be provided to predict how the driver will react. If the response time or the projected response time according to the driver model exceeds a threshold, the driver 164 may be deemed too drowsy and the system may begin intervention measures. Alternatively, or in addition, where an ensemble of stochastic techniques may be used, a majority vote may deem the driver 164 too drowsy. Neural networks and other predictive models may be imperfect. For instance, they may have only been trained or learned for a short time so as to cause their generated predictions to be in error by a substantial amount, such as 25%, without a possible further reduction. It may be an advantage to create multiple networks or driver models—an ensemble, to determine what most models render as a prediction. This ensemble learning or modeling may be better than relying on a single model. If a simple majority of the models or an averaged predicted response predict that the driver will respond too slowly to a given hazard, then the system should intervene, as previously described.

In addition to identifying driver drowsiness based on longitudinal and/or lateral behaviors, the driver-facing camera 245 may also be used, either alone or in combination with the determination of the delay, corrective force, and damping. In this case, drowsiness may be determined by identifying a decreasing variance in the driver's head yaw over time, identifying the driver's head pitching forward, and/or identifying the driver's eyes closing. Taken together, these results may form a strong indication of drowsiness and a reliable trigger for intervention by the system. In an embodiment, the intervention measures may include, for example, reducing the speed of the vehicle, providing warning indications, altering warning indications, re-routing the driver's navigation system to a rest area, deploying an active vehicle dynamic addition (e.g., active lane-keeping assist, active steering, one-sided braking), and the like. Where a vehicle 112 may be operating autonomously, lateral, and longitudinal behaviors may be impossible to gauge. Accordingly, the system may prompt the driver 164 to assume control of the vehicle 112 at regular or irregular intervals to assess whether the driver 164 is drowsy using the techniques previously described.

A block of behavioral data may be used to determine a driver's values of delay, corrective force, and damping with reference to the following example. A driver operating a truck may detect, as he or she enters a roadway, a cyclist 328 feet away. The cyclist may be traveling at 13.4 miles per hour (MPH). In response, the driver may apply the brakes to reduce the speed from 47 MPH to match the cyclist's 13.4 MPH, safely adjusting his/her speed before reaching the cyclist. The driver may exhibit a one second reaction time. The driver's braking efforts may apply a deceleration of 8.2 feet per second. Since the driver's truck is initially traveling at 47 MPH, which is 68.9 feet per second, and he/she reduces the vehicle speed to 13.4 MPH, which is 19.6 feet per second, the braking may require about 6 seconds. This can be seen by subtracting 19.6 from 68.9 and dividing the difference by 8.2. Between the time that the driver identifies the cyclist and the time he/she matches the cyclist's speed, the truck will have traveled (distance traveled over reaction time)+(time*initial speed)−(½ *deceleration*time*time) feet. Substituting the values, (1 s*68.9 ft/s)+(6 s*68.9 ft/s)−(½*8.2 ft/s²*6 s*6 s)=482.3 ft-147.6 ft=334.7 feet. Therefore, it may be seen that the driver may reach the cyclist's speed at just beyond the same location where he/she first identified the cyclist, a little over 328 feet away. Fortunately, the cyclist continued riding throughout the 7-second duration at 13.4 MPH, advancing 137.2 feet, which places him 130.5 feet ahead of the truck when they are traveling at the same speed.

The data collected from the event detection and reporting system 200 during this example may be used to recover the driver's reaction time, corrective force, and damping parameter values. Assuming a 0.25 second sampling interval, the raw measurements for the truck may be shown in Table 1 below:

TABLE 1

| Time (s) | Deceleration (ft/s²) | Distance (ft) |
|---|---|---|
| 0 | 0 | 328 |
| 0.25 | 0 | 310.8 |
| 0.5 | 0 | 293.6 |
| .75 | 0 | 276.4 |
| 1 | 8.2 | 259.2 |
| 1.25 | 8.2 | 259 |

The problem may be formulated in discrete time as a set of difference equations, known as the discrete-time difference equation framework. Here, "k" is a time index, "a" is acceleration and "dd" is the distance to the vehicle or object ahead and a1, a2 . . . b0, b1, b2 . . . are coefficients that relate the acceleration value at the $k^{th}$ time step to the previous time step's acceleration value $a(k-1)$, the current distance value $dd(k)$, and the previous distance and acceleration values (e.g., $a(k-2)$ and $dd(k-3)$, etc.), such that:

$$A(k)=a1*a(k-1)+a2*a(k-2)+\ldots a7*a(k-7)+a8*a(k-8)+b0*dd(k)+b1*dd(k-1)+b2*dd(k-2)+\ldots b7*dd(k-7)+b8*dd(k-8)$$

The acceleration may be modeled as a weighted sum of past acceleration values, current distances, and past distances, up to some number of time steps in the past. The measured data may by collected in matrix form as shown in Table 2 below:

TABLE 2

$$\begin{bmatrix} a_n \\ a_{n-1} \\ a_{n-2} \end{bmatrix} = \begin{bmatrix} a_{n-1} & a_{n-2} & \ldots & d_n & d_{n-1} & \ldots \\ a_{n-2} & a_{n-3} & \ldots & d_{n-1} & d_{n-2} & \ldots \\ a_{n-3} & a_{n-4} & \ldots & d_{n-2} & d_{n-3} & \ldots \end{bmatrix} \begin{bmatrix} a_1 \\ a_2 \\ \ldots \\ a_8 \\ b_0 \\ b_1 \\ \ldots \\ b_8 \end{bmatrix}$$

The matrix equation may be solved for the coefficients $a_1, a_2 \ldots a_8$, and $b_0, b_1, b_2 \ldots b_8$. Note that there may be more equations than coefficients, so a least-squares approach may be preferred. A least-squares approach may also be beneficial in that there may be measurement noise and/or quantization in the measured acceleration and distance values, which the calculation method should preferably be able to accommodate.

The results show that $b_0$ to $b_3$ are zero or nearly zero, depending on noise levels. This may indicate that the driver reacts (e.g., reaction time) to delayed values of distance.

That is, 4 steps of 0.25 seconds each equates to one second of reaction time delay; a finer granularity of steps would increase reaction time resolution. The discrete time different equation framework may naturally allow for delays. For instance, if the values of b(0) to b(3) are near zero (e.g. less than 5% of b(4), b(5), etc.), then this may be taken as an indication that the driver needs 4 time steps to respond to distance changes; i.e., has a 4 time step reaction time. The values of b4 and b5 may be related to the corrective force and damping parameter values.

The acceleration of the driver's vehicle 112 and the distance values to the vehicle ahead may be collected in the case of modeling the driver's longitudinal behavior. In the case of modeling the driver's lateral behavior, steering angle and the distance to lane markers may be collected instead. The collected sensor data may be processed using the discrete-time difference equation framework previously discussed. The equation may collect and organize the collected data. The collection may be performed in discrete time steps, e.g., every quarter second, and may relate the past values of acceleration and distance to what the driver 164 is doing now. Because the framework allows for adding or subtracting distance and acceleration values, it is called a difference equation. The subtracting, in particular, may allow for the approximation of rates and thus allows for discrete-time approximation of differential equations.

The driver's reaction time may be read from the number of distance-related coefficients initially zero or near zero. The driver's corrective force and damping values may be calculated from the other remaining coefficients. The calculation may be performed by the system for a smaller sequence of measurements within each longer measurement block. Since the least-squares calculation may require a computational effort proportional to the cube of the number of points measured, data may be collected at every other or every third interval within a longer block. Alternatively, recursive least-squares or Kalman filtering may be used to derive a driver model. A further possibility to reduce calculation effort may be to assume that the driver model is constant over a period of time, such as 30 minutes, solve for the model for 3-minute blocks, and then average the results of the ten 3-minute blocks. For a time span covering multiple 30 minute blocks, for example, a trend line may be fitted and its results used to characterize the driver 164 now and in the near future.

In modeling the driver's longitudinal behavior, it may make sense to collect data when a leading object is present. When a leading object is present, the system may identify "significant" dynamics occurring, such as when the lead vehicle applies the brakes, thereby choosing the events that will yield useful modeling measurements. The above example of difference equations has an object present, for instance, to which the distance may be measured. Changes in the distance to the object may require the driver 164 to respond, and it is this response that characterizes the driver. The data may be collected and analyzed as it accumulates for useful content. Useful content may include, for example, a changing distance of the leading object or vehicle, active braking, and the like. Maintaining an approximately constant distance at an approximately constant speed yields little information regarding driver reactions, for instance, but may reflect the distance the driver 164 maintains at various speeds. The results of the model fitting for each event within the longer block may be aggregated to a median or average value set, which may represent the driver's behavior over that block of time. In this way, multiple long blocks with aggregated model parameters within each may be accumulated. Within these multiple long blocks, the trending calculations may be performed. It may be useful to keep the results from each individual event to fractionally overlap the blocks as previously described. As an example, it may be assumed that three blocks of three events exist, including a first block of events a, b, c; a second block of events d, e, f; and a third block of events g, h, and i. These blocks may be shifted into new longer blocks, including a first block including events b, c, d and a second block including events e, f, g, and h, where each of the new long blocks may be 30 minutes long, for example. The shifted values may subsequently be aggregated.

The present subject matter provides an improved technique for determining driver drowsiness while operating a vehicle using vehicle event data generated by onboard computing systems disposed within the vehicle. The onboard vehicle computing systems are specialized devices that may be interfaced with various vehicle sensors, systems, subsystems, and communication infrastructure also disposed within the vehicle and connected via communication links, such as a CANbus, to provide vehicle event reporting, safety-related functionalities, trip logging, and the like. The resulting determination of driver drowsiness may be used in a number of ways, including to generate reports, to generate alerts to a fleet manager or supervisor, to intervene by providing warnings to the driver, to re-route the vehicle navigation system to a rest area, to adjust a temperature of the passenger compartment of the vehicle, to output a warning sound, or provide other forms of haptic, visual, or audio feedback. Doing so may alert the driver 164 to his or her drowsy condition, thus improving the safety of operating vehicles, such as commercial trucks.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps, or acts are in some way inherently mutually exclusive.

Reference throughout this document to "one embodiment", "certain embodiments", "an embodiment" or similar term means that a feature, structure, or characteristic described in connection with the embodiment is included in at least one embodiment of the present subject matter. Thus, the appearances of such phrases or in various places throughout this specification are not necessarily all referring to the same embodiment. Furthermore, the features, structures, or characteristics may be combined in any suitable manner without limitation.

In accordance with the practices of persons skilled in the art of computer programming, the present subject matter is described with reference to operations that are performed by a computer system or a like electronic system (e.g., "the system"). Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor 230 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, any physical medium with patterns of holes, a RAM, PROM, and EPROM, a FLASH-EPROM, any other memory chip or cartridge, or any other tangible non-transitory medium from which a computer can read.

In addition, and further in accordance with the descriptions herein, the term "logic," as used herein, with respect to FIG. 2A, includes hardware, firmware, software in execution on a machine, and/or combinations of each to perform a function(s) or an action(s), and/or to cause a function or action from another logic, method, and/or system. Logic may include a software-controlled microprocessor, a discrete logic (e.g., ASIC), an analog circuit, a digital circuit, a programmed logic device, a memory device containing instructions, and so on. Logic may include one or more gates, combinations of gates, or other circuit components.

Figure 7:
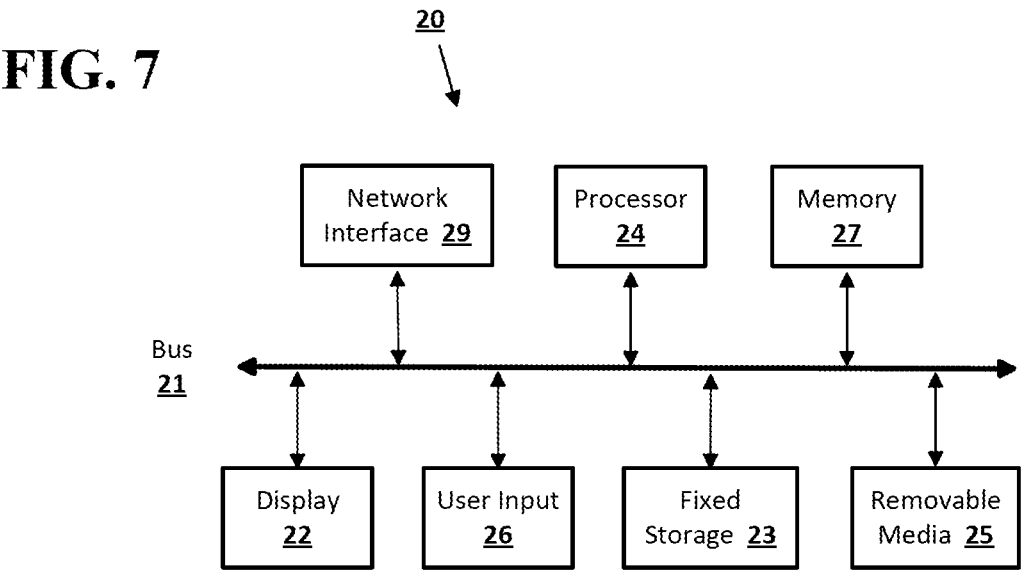
FIG. 7 is a computing device according to an embodiment of the disclosed subject matter.

Embodiments of the presently disclosed subject matter may be implemented in and used with a variety of component and network architectures. FIG. 7 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. The central processor 24 may form a microcontroller, such as the microcontroller 201 previously discussed. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium. In an embodiment, the bus 21 may be a Controller Area Network (CAN bus) disposed within the body of a vehicle.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
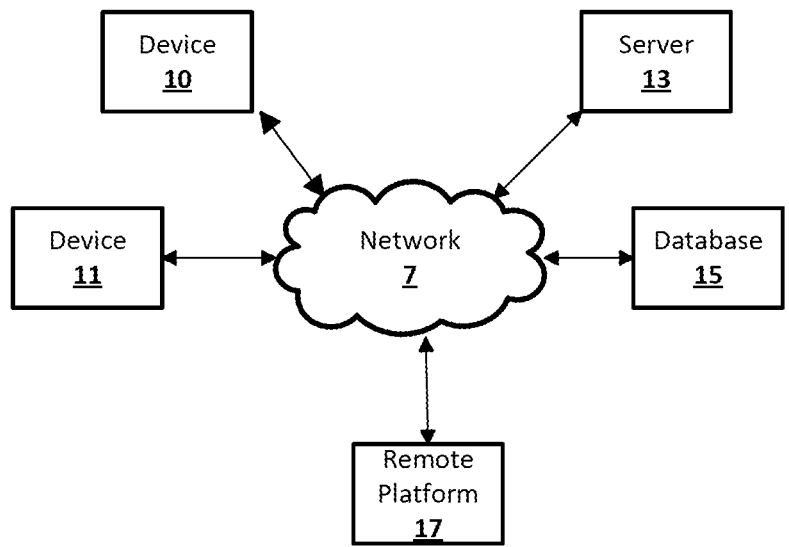
FIG. 8 shows a network configuration according to an embodiment of the disclosed subject matter.

FIG. 8 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, Controller Area Network (CAN bus) or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 9:
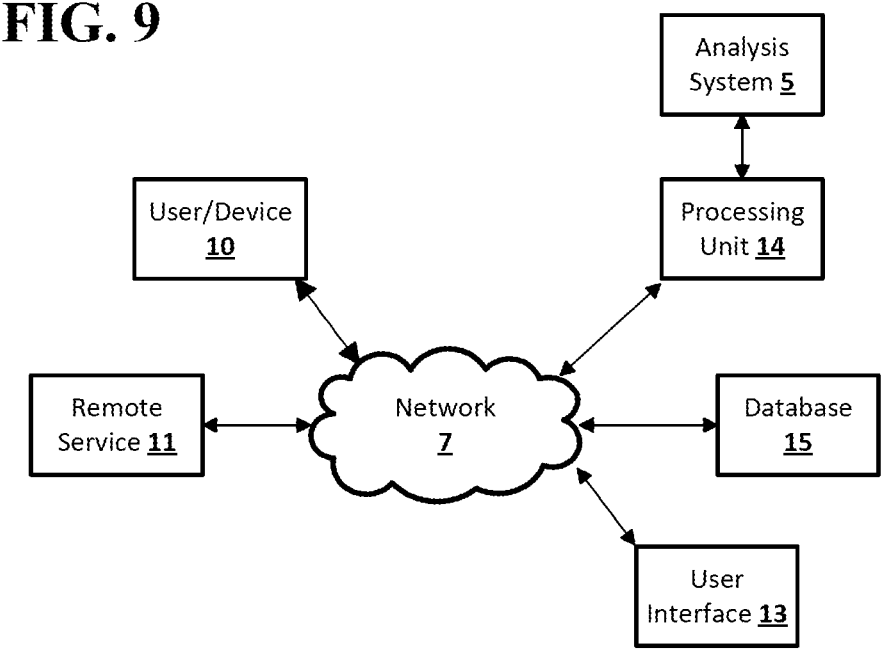
FIG. 9 shows an example network and system configuration according to an embodiment of the disclosed subject matter

FIG. 9 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing center 14 may be part of an integral system, or may include multiple computer systems communicating via a private network, the Internet, or any other suitable network. The processing center 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing center 14, database 15, and/or user interface 13. For example, the analysis system 5 may provide various prediction models, data analysis, or the like to one or more other systems.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk, or any other device capable of storing electronic information. The memory may store instructions adapted to be executed by the processor to perform the techniques according to embodiments of the disclosed subject matter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of performing a vehicle-based safety intervention, comprising:
   receiving sensor data collected or generated by an onboard computing system of a vehicle;
   dividing the sensor data into a plurality of blocks, each of the blocks having a duration;
   applying a driver behavioral model to one or more of the plurality of blocks to generate a plurality of driver behavioral parameters for each block;
   determining that a driver's performance when operating the vehicle is unsatisfactory or will be unsatisfactory in the future; and
   generating a vehicle-based intervention based on the determination that the driver's performance is unsatisfactory or will be unsatisfactory in the future;
   wherein the plurality of driver behavioral parameters includes a delay corresponding to a reaction time of the driver, a corrective force proportional value corresponding to a magnitude with which the driver takes corrective action and a damping value corresponding to a modulation of the corrective action; and
   wherein the determination that the driver's performance is unsatisfactory or will be unsatisfactory in the future is based on a determination that a combination of the delay, the corrective force and the damping value exceeds a multidimensional bound.

2. The method of claim 1, wherein the driver behavioral model comprises one or more of:
   the driver's lateral behavior when operating the vehicle; or
   the driver's longitudinal vehicle behavior when operating the vehicle.

3. The method of claim 2, wherein the driver's longitudinal behavior comprises at least one of:
   maintaining a predetermined distance from a leading vehicle; or
   maintaining an approximately same velocity as the leading vehicle.

4. The method of claim 2, wherein the driver's lateral behavior comprises:
   maintaining position of the vehicle in a driving lane.

5. The method of claim 1, wherein
   the determining that a driver's performance when operating the vehicle is unsatisfactory or will be unsatisfactory in the future further comprises:
   extracting a trend-over-time model of the plurality of driver behavioral parameters for each of the plurality of blocks;
   extrapolating the trend-over-time model to identify a future plurality of blocks; and
   comparing the future plurality of blocks with the predefined threshold.

6. The method of claim 1, wherein the corrective action comprises one or more of:
   controlling an accelerator of the vehicle;
   controlling a brake of the vehicle; or
   controlling a steering control of the vehicle.

7. The method of claim 1, further comprising:
   determining, based on comparing each of the plurality of behavioral parameters with a respective predefined threshold, that the driver's performance when operating the vehicle is satisfactory.

8. A system of performing a vehicle-based safety intervention, comprising:
a processor;
a memory in communication with the processor, the memory storing a plurality of instructions executable by the processor to cause the system to:
receive sensor data collected or generated by an onboard computing system of a vehicle;
divide the sensor data into a plurality of blocks, each of the blocks having a duration;
apply a driver behavioral model to one or more of the plurality of blocks to generate a plurality of driver behavioral parameters for each block;
determine that a driver's performance when operating the vehicle is unsatisfactory or will be unsatisfactory in the future; and
generate a vehicle-based intervention based on the determination that the driver's performance is unsatisfactory or will be unsatisfactory in the future;
wherein the plurality of driver behavioral parameters includes a delay corresponding to a reaction time of the driver, a corrective force proportional value corresponding to a magnitude with which the driver takes corrective action and a damping value corresponding to a modulation of the corrective action; and
wherein the determination that the driver's performance is unsatisfactory or will be unsatisfactory in the future is based on a determination that a combination of the delay, the corrective force and the damping value exceeds a multidimensional bound.

9. The system of claim 8, wherein the driver behavioral model comprises one or more of:
the driver's lateral behavior when operating the vehicle; or
the driver's longitudinal vehicle behavior when operating the vehicle.

10. The system of claim 9, wherein the driver's longitudinal behavior comprises at least one of:
maintaining a predetermined distance from a leading vehicle; or
maintaining an approximately same velocity as the leading vehicle.

11. The system of claim 9, wherein the driver's lateral behavior comprises:
maintaining position of the vehicle in a driving lane.

12. The system of claim 8, wherein the memory further comprises instructions executable by the processor to cause the system to:
identify, based on the sensor data, a decreasing variance in the driver's head yaw over time or an increasing average forward pitch angle.

13. The system of claim 8, wherein the corrective action comprises one or more of:
controlling an accelerator of the vehicle;
controlling a brake of the vehicle; or
controlling a steering control of the vehicle.

14. The system of claim 8, wherein
the memory further comprises instructions executable by the processor to cause the system to, during the determination that a driver's performance when operating the vehicle is unsatisfactory or will be unsatisfactory in the future:
extract a trend-over-time model of the plurality of driver behavioral parameters for each of the plurality of blocks;
extrapolate the trend-over-time model to identify a future plurality of blocks; and
compare the future plurality of blocks with the predefined threshold.

* * * * *